Sept. 24, 1963 H. LERNER 3,105,196

TRANSISTOR AND TUBE GATING CIRCUIT

Filed Dec. 21, 1959

*INVENTOR.*
HAROLD LERNER

*BY* H. L. Mackey

ATTORNEY.

3,105,196
Patented Sept. 24, 1963

3,105,196

TRANSISTOR AND TUBE GATING CIRCUIT

Harold Lerner, East Paterson, N.J., assignor to General Precision, Inc., a corporation of Delaware Filed Dec. 21, 1959, Ser. No. 861,006
3 Claims. (Cl. 328—91)

This invention relates generally to pulsing or gating circuits and particularly to a circuit for generating large amplitude pulses from low level input pulses.

In the electronic art high power pulses are often required for a variety of purposes such as for gating a high power klystron amplifier on and off. The large amount of power required is usually obtained from a power output tube which is turned on and off by a suitable signal applied to the grid. Such a pulse generator is satisfactory but has the disadvantage that a large grid voltage swing is necessary to switch the tube from nonconduction to full conduction. Generation of the required voltage swing in turn usually requires several stages of amplification to raise the triggering signal to the required amplitude. These additional stages require several valves such as transistors or tubes together with the necessary circuitry and attendant power supplies.

It is a general object of the invention to provide apparatus for generating high power pulses.

A more specific object is to provide greatly simplified apparatus for generating high power pulses in accordance with low level signals.

Another object is to provide simple apparatus for switching a power tube on and off in accordance with a low level signal.

Briefly stated, the invention comprises a power tube connected as a grounded grid amplifier. The cathode is returned to ground through the collector-emitter circuit of a transistor. In the absence of a potential on the base of the transistor neither the transistor nor the tube conduct appreciably. However, the application of a small positive pulse to the transistor causes both the transistor and the tube to conduct heavily so that a high power output pulse is available at the anode.

For a clearer understanding of the invention reference may be made to the following detailed description and the accompanying drawing, in which.

Figure 1:
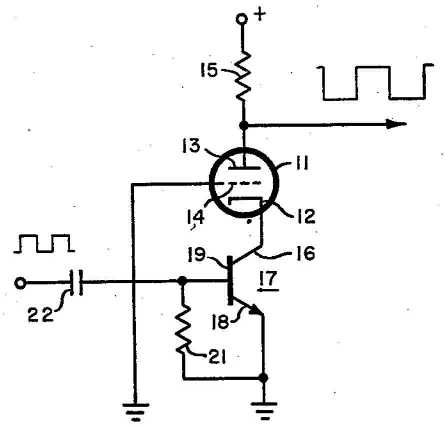
FIGURE 1 is a schematic diagram of a pulse generator in accordance with the invention.

Referring first to FIG. 1, there is shown an electron tube 11 having a cathode 12, an anode 13 and a control electrode 14. The anode 13 is connected through a load resistor 15 to a source of positive potential, the control electrode is grounded, and the cathode 12 is connected to the collector 16 of an NPN transistor 17. The emitter 18 is connected directly to ground while the base 19 is grounded through a resistor 21. The base 19 is also coupled to an input circuit by means of a capacitor 22.

In the absence of a signal on the base 19 there is no base-emitter bias and the transistor 17 is quiescent, that is, it does not conduct appreciably. In this condition the collector-emitter circuit has a high impedance on the order of a megohm or so and a positive potential is present on the collector 16. This potential, although small compared to the positive supply voltage, is ample to bias the transistor for proper operation. The potential of the cathode 12 is the same as that of the collector 16 and this potential together with the high resistance of the cathode to ground circuit renders the tube 11 substantially nonconductive, only a small leakage current flowing.

Application of a positive signal to the base 19 immediately causes the transistor 17 to conduct heavily because of the inherent current amplification characteristics of the transistor. Conduction reduces the impedance of the collector-emitter circuit to a small value, on the order of one ohm or less, causing a current surge through the tube 11 and the resistor 15. At the termination of the positive pulse applied to the base 19, the transistor 17 and the tube 11 revert to their quiescent state with the current through the resistor 15, tube 11 and transistor 17 dropping to a very small value. The sudden changes in current through the resistor 15 make a large amplitude output pulse available at the anode 13.

A specific embodiment of the invention has been tested in which the tube 11 was a type 5687 dual triode with the two sections connected in parallel. The transistor 17 was a type 2N696, resistor 15, 1,000 ohms, resistor 21, 470 ohms, and capacitor 22, 0.05 $\mu$f. Positive voltage was 300 volts. In the absence of a signal on the base 19, the collector 16 and the cathode 12 assume a potential of +20 volts with respect to ground. Application to the base 19 of a 500 kc.p.s. square wave having an amplitude of 0.5 volt produced a 500 kc.p.s. output wave across resistor 15 with an amplitude of 150 volts. Since the output wave was developed across the comparatively low resistance of 1,000 ohms, ample power output was available.

It is thus apparent that the present invention provides a very simple circuit for generating high power pulses from a low level input signal. Only one auxiliary valve, the transistor 17, is required in addition to the power output tube. No additional voltages or separate power supplies are required for the transistor 17, all biases being supplied simply by the current flowing through the anode-cathode circuit of the tube 11. The coupling between the transistor and tube is simple—a direct connection from collector to cathode.

Figure 2:
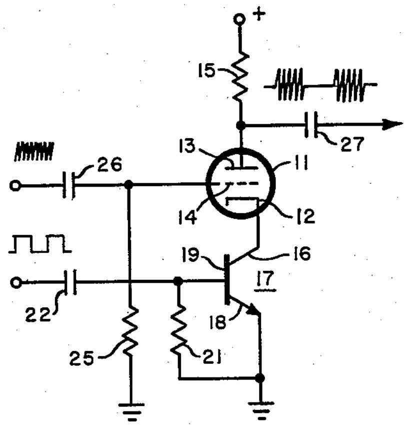
FIGURE 2 is a schematic diagram of a modification showing how the invention may be used to generate pulses of radio frequency energy.

The configuration of FIG. 1 may of course be modified so as to serve other purposes while retaining the basic features of the invention. For example, as shown in FIG. 2, the invention may be used to generate a series of pulses of radio frequency energy. The configuration is quite similar to that of FIG. 1. However, the grid 14 instead of being grounded directly is returned to ground through a resistor 25, and a capacitor 26 has been provided to couple radio frequency energy to the grid 14. Also, a capacitor 27 has been included in the output circuit to remove the D.C. component. The remainder of the circuit is identical to that of FIG. 1.

In operation, a radio frequency such as a 30 mc.p.s. sine wave is coupled to the grid 14 through the capacitor 26 while a lower frequency square wave, perhaps on the order of 50 to 500 kc.p.s., is applied through the capacitor 22 to the base 19 as before. The circuit operates much as does that of FIG. 1 except that the output consists of a series of pulses of radio frequency energy.

Figure 3:
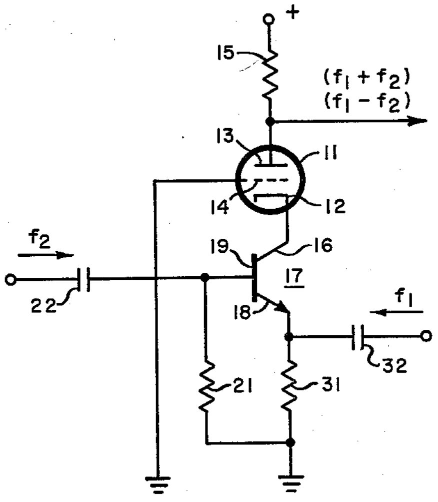
FIGURE 3 is a schematic diagram of another embodiment showing how the invention can be used as a modulator and amplifier.

As another example, the invention may be used as a modulator and amplifier as shown in FIG. 3. This configuration is like that shown in FIG. 1 except that the emitter 18, instead of being connected directly to ground, is returned to ground through a resistor 31. Additionally, an input circuit is coupled to the emitter 18 by a capacitor 32.

In operation, two voltages of different frequencies, in the audio or radio frequency range, are applied to the emitter 18 and the base 19 respectively. The usual modulation products are formed which appear in the circuit of the collector 16 and which are amplified by the tube 11. Output is of course taken from the anode 13.

While a number of specific embodiments of the invention have been illustrated, many modifications within the spirit of the invention will occur to those skilled in the art. For example, the circuit could be modified to use a PNP transistor, although at present the arrangement described is preferred. It is therefore desired that the protection afforded by Letters Patent be limited only by the true scope of the appended claims.

What is claimed is:

1. An electric circuit, comprising, an electron tube having a cathode, an anode and a control electrode, an impedance connected between said anode and a source of positive potential, a transistor having a collector, an emitter and a base, means for biasing said control electrode, said emitter and said base at the same potential, and a direct connection between said collector and said cathode, whereby potential variations of said base cause variations in the conductivity of said transistor and said tube.

2. An electric circuit, comprising, an electron tube including a cathode, an anode and a control electrode, a first resistor connected between said anode and a source of positive potential, a transistor including a collector, an emitter and a base, a direct connection between said collector and said cathode, a direct connection between said emitter and ground, and means for biasing said control electrode and said base at ground potential said means comprising a second resistor connected between said control electrode and ground and further comprising a third resistor connected between said base and ground, whereby when a high frequency alternating voltage is applied between said control electrode and ground and positive pulses of low frequency energy are applied between said base and ground, a series of pulses of high frequency energy appear at said anode.

3. An electric circuit, comprising, an electron tube having a cathode, an anode and a control electrode, a first resistor connected between said anode and a source of positive potential, an output circuit coupled to said anode, a direct connection between said control electrode and ground, a transistor having a collector, an emitter and a base, a direct connection between said cathode and said collector, and means for biasing said emitter and said base at ground potential, said last named means comprising a second resistor connected between said emitter and ground and further comprising a third resistor connected between said base and ground, whereby application of alternating current of different frequencies across said second and third resistors causes alternating currents of new frequencies to appear in said output circuit.

References Cited in the file of this patent

UNITED STATES PATENTS

| | | |
|---|---|---|
| 2,597,796 | Hindall | May 20, 1952 |
| 2,649,543 | Trachtenberg | Aug. 18, 1953 |
| 2,698,416 | Sherr | Dec. 28, 1954 |
| 2,809,304 | Dickinson | Oct. 8, 1957 |
| 2,825,806 | Bergfors | Mar. 4, 1958 |
| 2,862,104 | Summers | Nov. 25, 1958 |
| 2,872,570 | Dickinson | Feb. 3, 1959 |
| 2,872,592 | Dickinson | Feb. 3, 1959 |
| 2,926,307 | Ehret | Feb. 23, 1960 |
| 2,935,693 | Landsberg | May 3, 1960 |

FOREIGN PATENTS

| | | |
|---|---|---|
| 172,350 | Great Britain | Dec. 6, 1921 |